United States Patent
Brueggen

(10) Patent No.: US 8,521,940 B2
(45) Date of Patent: Aug. 27, 2013

(54) PAIRED NODE CONTROLLERS

(75) Inventor: Chris M. Brueggen, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 12/606,339

(22) Filed: Oct. 27, 2009

(65) Prior Publication Data

US 2011/0096786 A1 Apr. 28, 2011

(51) Int. Cl.
*G06F 13/20* (2006.01)
(52) U.S. Cl.
USPC .......................................... 710/313; 370/400
(58) Field of Classification Search
USPC .................. 370/400; 710/305–316; 711/146
See application file for complete search history.

(56) References Cited

U.S. PATENT DOCUMENTS

| | | | |
|---|---|---|---|
| 6,601,128 B1* | 7/2003 | Burton et al. | 710/316 |
| 7,080,191 B2* | 7/2006 | Murdock et al. | 711/101 |
| 7,315,914 B1* | 1/2008 | Venkatanarayanan et al. | 710/316 |
| 2010/0257301 A1* | 10/2010 | Kloeppner et al. | 710/313 |
| 2010/0274975 A1* | 10/2010 | Sistla et al. | 711/146 |

\* cited by examiner

*Primary Examiner* — Hassan Kizou
*Assistant Examiner* — Emmanuel Maglo

(57) ABSTRACT

In at least some embodiments, an apparatus comprises a pair of node controllers, each of the node controllers having a different processor assigned thereto. Each node controller is operable to selectively switch processor requests received from its assigned processor to the other node controller and to selectively switch responses to the processor requests to the other node controller.

20 Claims, 3 Drawing Sheets

PAIRED NODE CONTROLLERS

BACKGROUND

The need for improved "system processing speed" in electronic devices (e.g., computers) is ongoing. System processing speed is affected by various factors such as the number of processors, clock speeds and bus bandwidth. Furthermore, management of interconnections/requests between processors affects system processing speed. Furthermore, management of interconnections/requests between processors and external system components affects system processing speed.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure implement a paired node controller scheme to improve system processing speed. The paired node controller scheme can be used with any processor or computer system such as the Intel-manufactured Nehalem-EX processors. The paired node controller scheme may be implemented, for example, in a chipset that provides an interface between a processor and other system components of a computer system.

Figure 1:
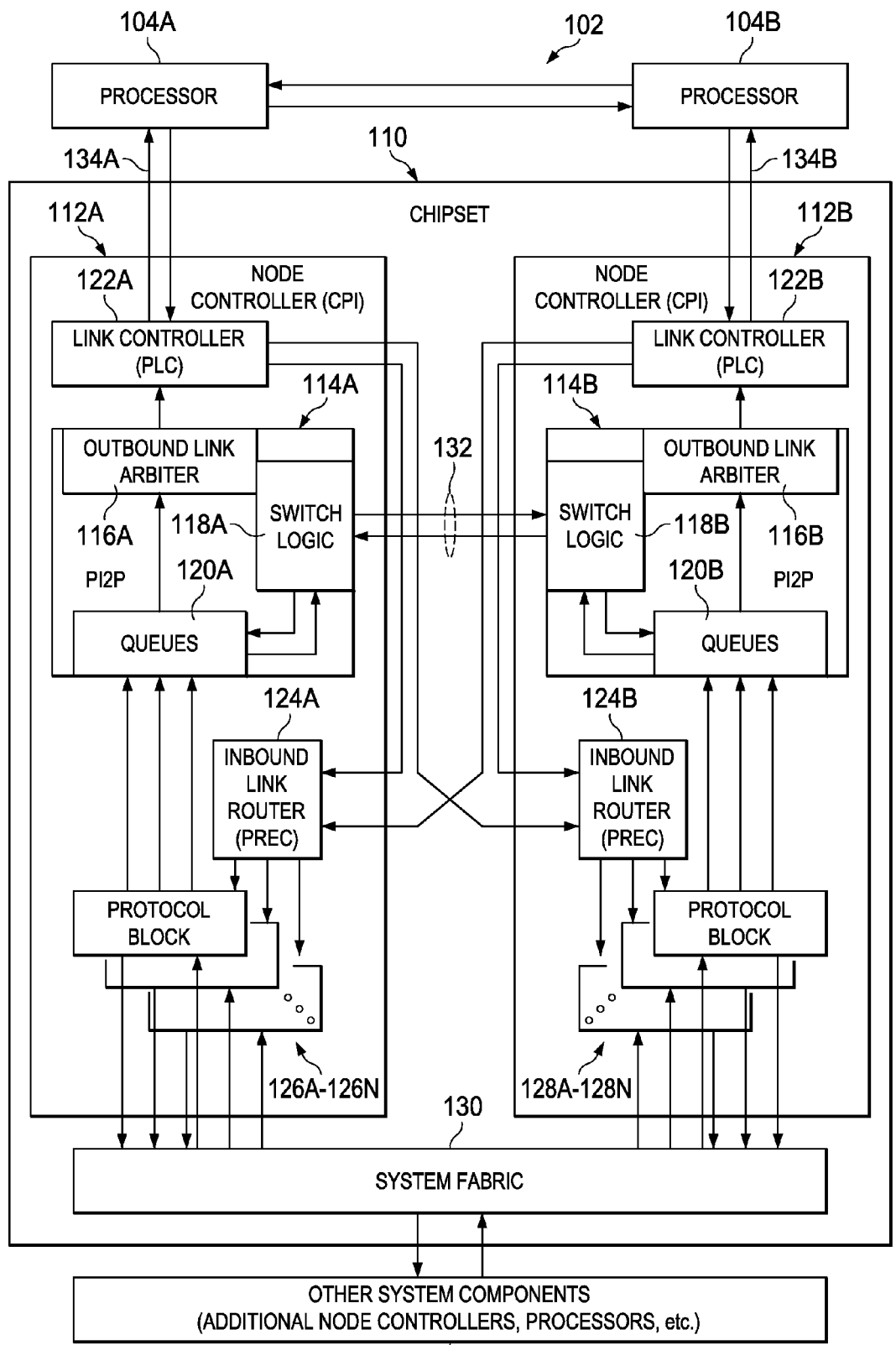
FIG. 1 shows a computer system in accordance with an embodiment of the disclosure.

FIG. 1 shows a computer system 102 in accordance with an embodiment of the disclosure. As shown, the computer system 102 comprises a pair of processors 104A and 104B coupled to other system components 140 via a chipset 110. As used herein, the term "processor" refers to a physical processor device installed into a socket or mounted onto a printed circuit board (PCB). Each processor may contain one or more processor cores and associated cache hierarchy and interconnects. As used herein, the term "chipset" refers to one or more physical devices that work in concert to provide a means of communication between a pair of directly linked processors (and perhaps other devices directly linked to those processors) and other components in the computer system 102. As shown, the processors 104A and 104B are coupled to a pair of node controllers 112A and 112B of the chipset 110. The node controllers 112A and 112B are configured to handle at least some communications between the processors 104A and 104B and the other system components 140.

In at least some embodiments, the pair of node controllers 112A and 112B exist within a single physical device (e.g., a semiconductor chip), which may comprise additional pairs of node controllers as well. In accordance with at least some embodiments, each pair of node controllers in the chipset services a pair of processors, where each processor is directly linked to one of the node controllers, and to the other processor as well. Each paired processor may have local memory attached to it, and may be linked to additional devices as well (e.g., an input/output agent). The pair of processors, the pair of node controllers, and other locally linked devices and memory may be referred to as a "node."

In FIG. 1, the node controller 112A comprises an area of logic 114A (referred to as PI2P) responsible for handling packets directed to the processors 104A and 104B. The PI2P logic 114A comprises queues 120A and arbitration logic 116A (referred to as an "outbound link arbiter") for packets in transit to the processors 104A and 104B. The PI2P logic 114A also comprises cross-connection (switch) logic 118A for forwarding packets to and receiving packets from the other node controller 112B. Similarly, the node controller 112B comprises PI2P logic 114B, which itself contains queues 120B, arbitration logic 116B for packets in transit to the processors 104A and 104B, and switch logic 118B for forwarding packets to and receiving packets from the node controller 112A. Communication between either of the paired processors 104A or 104B and other system components 140 may occur via node controllers 112A or 112B.

In at least some embodiments, requests to a remote memory (i.e., memory outside of the node where the request originates) are transmitted on a direct link from a processor to its physically linked node controller. However, upon reaching the node controller, a request may be switched over to the other node controller. More specifically, the node controller 112A comprises a link controller 122A that is directly linked to processor 104A. Requests by the processor 104A are received by the link controller 122A and then are forwarded to an inbound link router (PREC) 124A of the node controller 112A or, alternatively, to an inbound link router (PREC) 124B of the node controller 112B. The inbound link router 124A likewise may receive requests from the link controller 122B of the node controller 112B. The inbound link controller 124A operates to route requests received from link controllers 122A and 122B to a plurality of protocol blocks 126A-126N for transmission via a system fabric 130 to other system components 140 (e.g., additional node controllers, processors, etc.). As shown, the node controller 112B comprises its own inbound link controller 124B, which operates to route requests received from link controllers 122A and 122B to a plurality of protocol blocks 128A-128N for transmission via a system fabric 130 to other system components 140.

Responses en route to the processors 104A and 104B are received from the other system components 140 by the system fabric 130 and are organized into the protocol blocks 126A-126N or 128A-128N for handling by each PI2P logic 114A and 114B. As needed, incoming responses may be switched over to the other node controller in transit to the processor that issued the original request.

In accordance with at least some embodiments, the disclosed invention comprises a pair of node controllers (e.g., node controllers 112A and 112B), where each node controller has a unique node identifier for visibility by each of the paired processors 104A and 104B. Further, each node controller 112A and 112B selectively switches packets en route to the processors 104A and 104B from one node controller to the other (e.g., from one PI2P to the other). The packets may be switched, for example, via a pair of cross-connected buses 132 whose bandwidth is matched to outbound links 134A or 134B from the node controllers 112A and 112B.

In accordance with at least some embodiments, queues, arbitration logic, and switch logic within each PI2P of a node controller operate to handle packets en route to a processor. More specifically, each of the node controllers 112A and 112B may contain a PI2P which itself contains a plurality of queues for storing packets from within the node controller, or received from the other node controller. Further, each PI2P may contain a plurality of queues for storing packets to be forwarded to the other node controller or to the linked processor. Such queues for each PI2P are shown in FIG. 1 as queues 120A and 120B.

For arbitration, each PI2P 114A and 114B may comprise a first arbiter and a second arbiter. The first arbiter is embodied by the switch logic 118A or 118B and is for queued packets to be forwarded to the other node controller. In at least some embodiments, the first arbiter is configured to arbitrate among queued packets based on available buffer space in the other node controller. Meanwhile, the second arbiter is embodied by the outbound link arbiter 116A or 116B and is for queued local packets and queued packets received from the other node controller. In at least some embodiments, the second arbiter is configured to arbitrate among queued packets based on QPI link credit.

In QPI-link-based embodiments (e.g., with Nehalem-EX processors), switching of packets between node controllers 112A and 112B improves performance. This is because Nehalem-EX processors use a fixed number of QPI transaction identifiers (IDs) to issue requests to each node controller in the QPI domain. Making two node controllers visible to each processor doubles the number of requests each processor can have outstanding in the system. However, it necessitates switching of packets from one node controller to the other when a node controller receives a request from its connected processor that is directed to the other node controller, or when a node controller receives a response directed to the processor that is connected to the other node controller.

Figure 2:
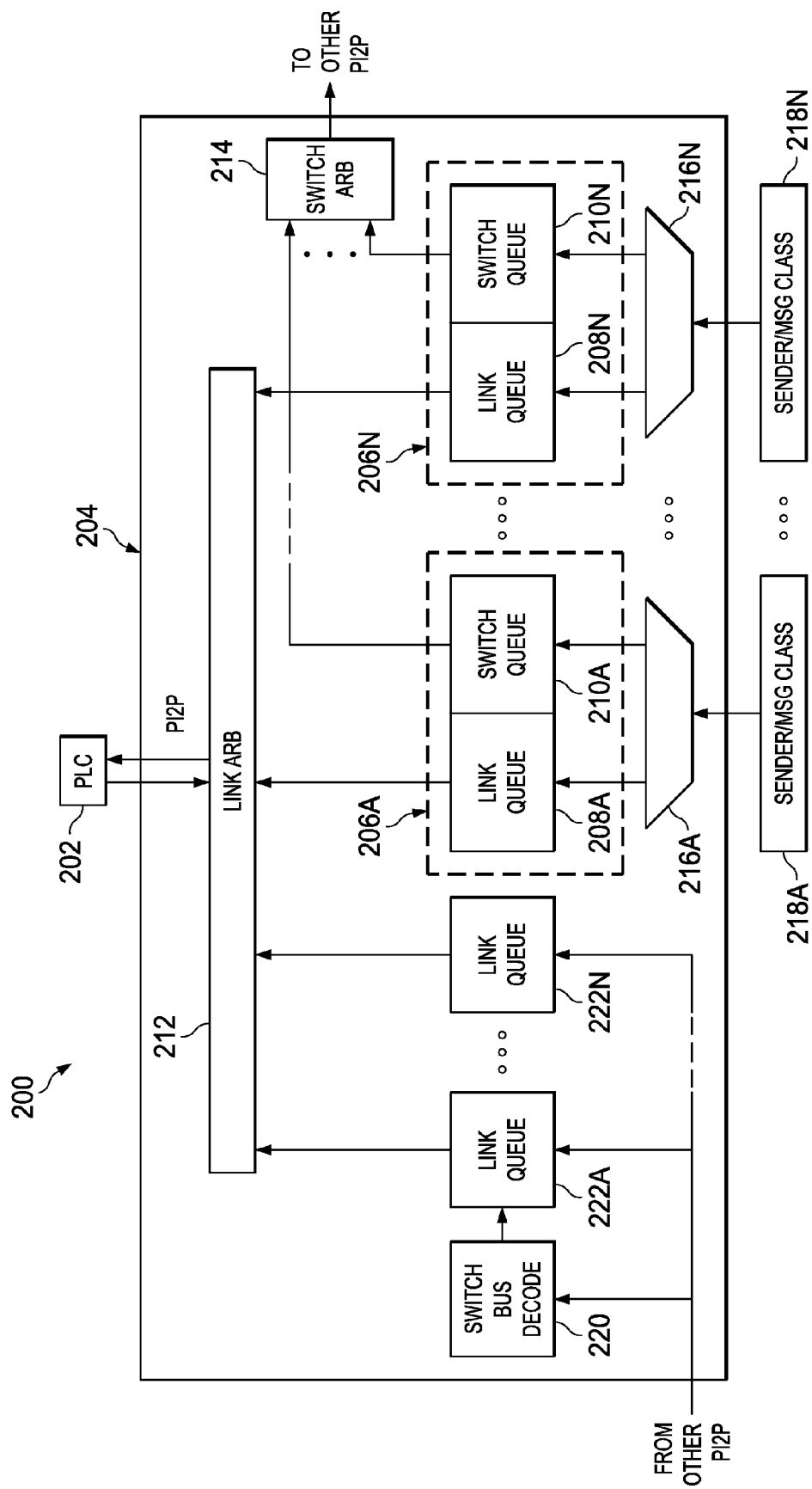
FIG. 2 shows part of a node controller in accordance with an embodiment of the disclosure.

FIG. 2 shows a portion of a node controller 200 (e.g., the node controller 112A or 112B) in accordance with an embodiment of the disclosure. As shown, the node controller 200 comprises PLC logic 202 coupled to PI2P logic 204. The PLC logic 202 may correspond to one of the link controllers 122A or 122B and the PI2P logic 204 may correspond to one of the PI2Ps 114A or 114B of FIG. 1.

In FIG. 2, the PI2P logic 204 comprises a plurality of message queues 206A-206N for queuing packets received from within the node controller (which may have resulted from packets received from system fabric). The packets received by the queues 206A-206N are received from sender/message class sources 218A-218N that may correspond to the protocol blocks 126A-126N or 128A-128N of FIG. 1. As shown, the packets from the sender/message class sources 218A-218N are selectively directed by de-multiplexers 216A-216N into link queues 208A-208N and switch queues 210A-210A that make up the message queues 206A-206N. The PI2P logic 204 also comprise a plurality of link queues 222A-222N configured to receive packets from the PI2P of a paired node controller (i.e., the paired node controller has a similar PI2P). Such packets received from the other PI2P are assigned to the link queues 222A-222N by switch bus decode logic 220. In at some embodiments, each PI2P is able to specify the link queue where the receiving PI2P should store a packet. In such case, the switch bus decode logic 220 may use that information to write to the proper link queue 222A-222N when the packet arrives from the other PI2P.

As shown FIG. 2, the link queues 222A-222N and 208A-208N couple to link arbiter 212. The link arbiter 212 is configured to arbitrate among queued packets based on QPI link credit and may correspond to the outbound link arbiter 116A or 116B mentioned previously. Meanwhile, the switch queues 210A-210N couple to switch arbiter 214, which may be part of the switch logic 118A or 118B discussed for FIG. 1. The switch arbiter 214 is configured to arbitrate among queued packets based on available buffer space in the other PI2P (i.e., the other node controller). In FIG. 2, the switch queues 210A-210N and the link queues 222A-222N and 208A-208N may correspond to the queues 120A or 120B described for FIG. 1

Figure 3:
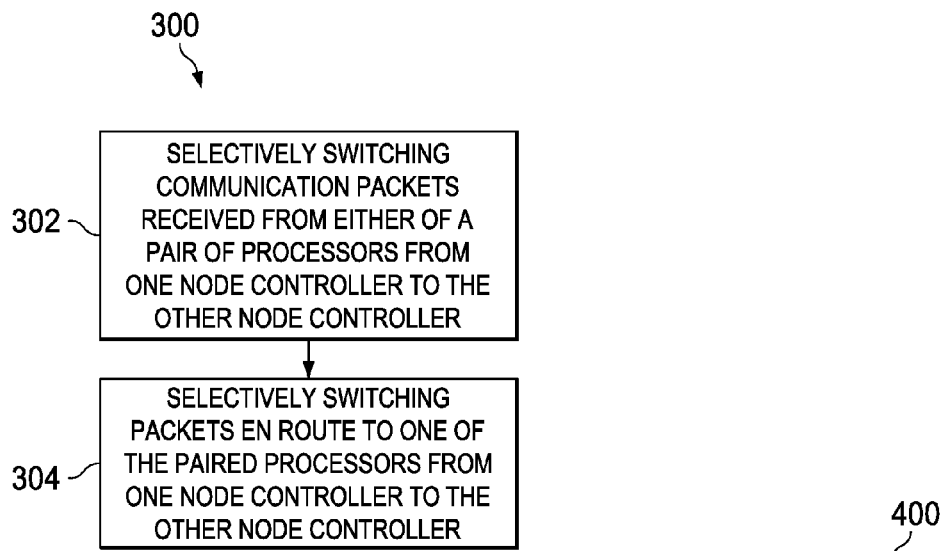
FIG. 3 shows a method in accordance with an embodiment of the disclosure.

FIG. 3 shows a method 300 in accordance with an embodiment of the disclosure. As shown, the method 300 comprises selectively switching inbound communication packets received from either of a pair of processors (inbound packets) from one node controller to the other node controller (block 302). The method 300 further comprises selectively switching communication packets en route to one of the pair of processors (outbound packets) from one node controller to the other node controller (block 304). In at least some embodiments, selectively switching communication packets (inbound or outbound packets) from one node controller to the other node controller comprises operating a cross-bus between the node controllers at a bandwidth that matches a node controller outbound bus bandwidth.

Figure 4:
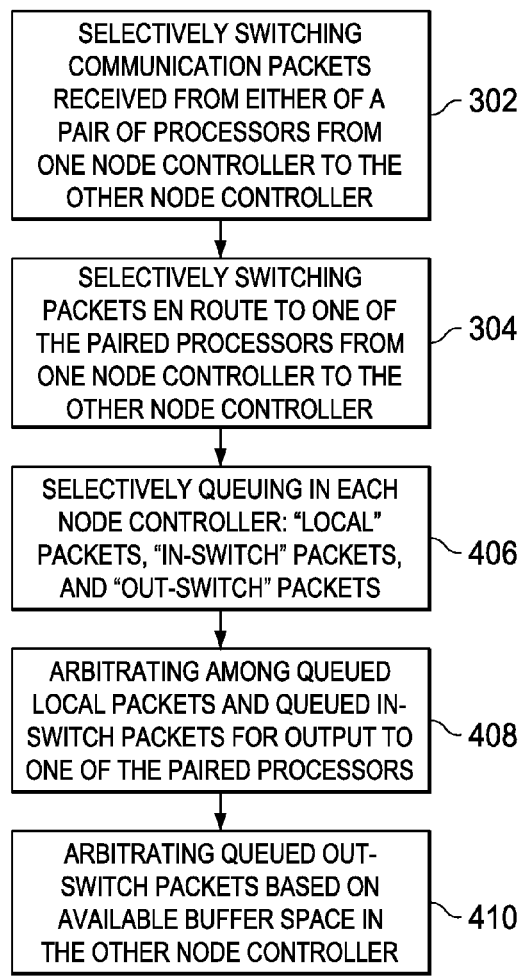
FIG. 4 shows another method in accordance with an embodiment of the disclosure.

FIG. 4 shows another method 400 in accordance with an embodiment of the disclosure. As shown, the method 400 comprises blocks 302 and 304 discussed for the method 300. In addition, the method 400 comprises additional steps that are added individually or in combination. As an example, the method 400 may additionally comprise selectively queuing in each node controller: packets from within the node controller ("local" packets), packets received from the other node controller ("in-switch" packets), and packets to be transmitted to the other node controller ("out-switch" packets) (block 406). The method 400 may further comprise arbitrating among queued local packets and queued in-switch packets for output to one of the paired processors based on QPI link credit (block 408). The method 400 may further comprise arbitrating queued out-switch packets based on available buffer space in the other node controller (block 410).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
a pair of node controllers, each of the node controllers having a different processor assigned thereto,
wherein each node controller is operable to selectively switch processor requests received from its assigned processor to the other node controller using a link controller and to selectively switch responses to said processor requests to the other node controller while specifying the location the response is to be placed in a queue.

2. The apparatus of claim 1 wherein each node controller comprises cross-connection logic and wherein each cross-connection logic comprises a switch bus decode block in communication with the queue, wherein the queue comprises a plurality of link queues.

3. The apparatus of claim 1 wherein each node controller comprises a plurality of message queue sets coupled to a link arbiter and a switch arbiter, each message queue set having a link queue and a switch queue.

4. The apparatus of claim 3 wherein the link arbiter is configured to arbitrate queued packets based on QPI link credit.

5. The apparatus of claim 3 wherein the switch arbiter is configured to arbitrate queued packets based on available buffer space in the other node controller.

6. A system, comprising:
a pair of processors; and
a pair of node controllers coupled together, wherein each processor is coupled to and assigned to a different one of said node controllers;
wherein, if a node controller receives an inbound communication packet from its assigned processor and the inbound communication packet is directed to the other node controller, the node controller that received the inbound communication packet switches the inbound communication packet to the other node controller using a link controller, and
wherein, if a node controller receives an outbound communication packet directed to the processor assigned to the other node controller, the node controller that received the outbound communication packet switches the outbound communication packet to the other node controller while specifying where the outbound communication packet is to be placed in a queue.

7. The system of claim 6 wherein each node controller couples to an outbound bus and wherein each node controller switches packets via a cross-connection bus having a bandwidth matched to the outbound busses.

8. The system of claim 6 wherein the queue comprise a plurality of link queues for storing packets received from the other node controller.

9. The system of claim 6 wherein each node controller comprises a plurality of queues for storing local packets and a plurality of queues for storing packets to be forwarded to the other node controller.

10. The system of claim 6 wherein each node controller comprises a first arbiter for queued packets to be forwarded to the other node controller.

11. The system of claim 10 wherein the first arbiter is configured to arbitrate queued packets based on available buffer space in the other node controller.

12. The system of claim 10 wherein each node controller comprises a second arbiter for queued local packets and queued packets received from the other node controller.

13. The system of claim 12 wherein the second arbiter is configured to arbitrate queued packets based on QPI link credit.

14. The system of claim 6 wherein each node controller comprises at least one queue for storing only local packets, at least one queue for storing only packets corresponding to the other node controller, and at least one queue for storing both local packets and packets corresponding to the other node controller.

15. A method, comprising:
selectively switching inbound communication packets received from either of a pair of processors from one node controller to the other node controller; and
selectively switching outbound communication packets en route to one of the pair of processors from one node controller to the other node controller while specifying where the outbound communication packet is to be placed in a queue.

16. The method of claim 15 wherein selectively switching communication packets from one node controller to the other node controller comprises operating a cross-bus between the node controllers at a bandwidth that matches a node controller outbound bus bandwidth.

17. The method of claim 15 further comprising selectively queuing in each node controller: local packets, in-switch packets received from the other node controller, and out-switch packets to be transmitted to the other node controller.

18. The method of claim 17 further arbitrating queued local packets and queued in-switch packets for output to one of the paired processors based on QPI link credit.

19. The method of claim 17 further comprising arbitrating queued out-switch packets based on available buffer space in the other node controller.

20. The method of claim 17 further comprising, for each node controller, assigning at least one queue for storing only local packets, assigning at least one queue for storing only packets corresponding to the other node controller, and assigning at least one queue for storing both local packets and packet corresponding to the other node controller.

* * * * *